Patented Feb. 3, 1925.

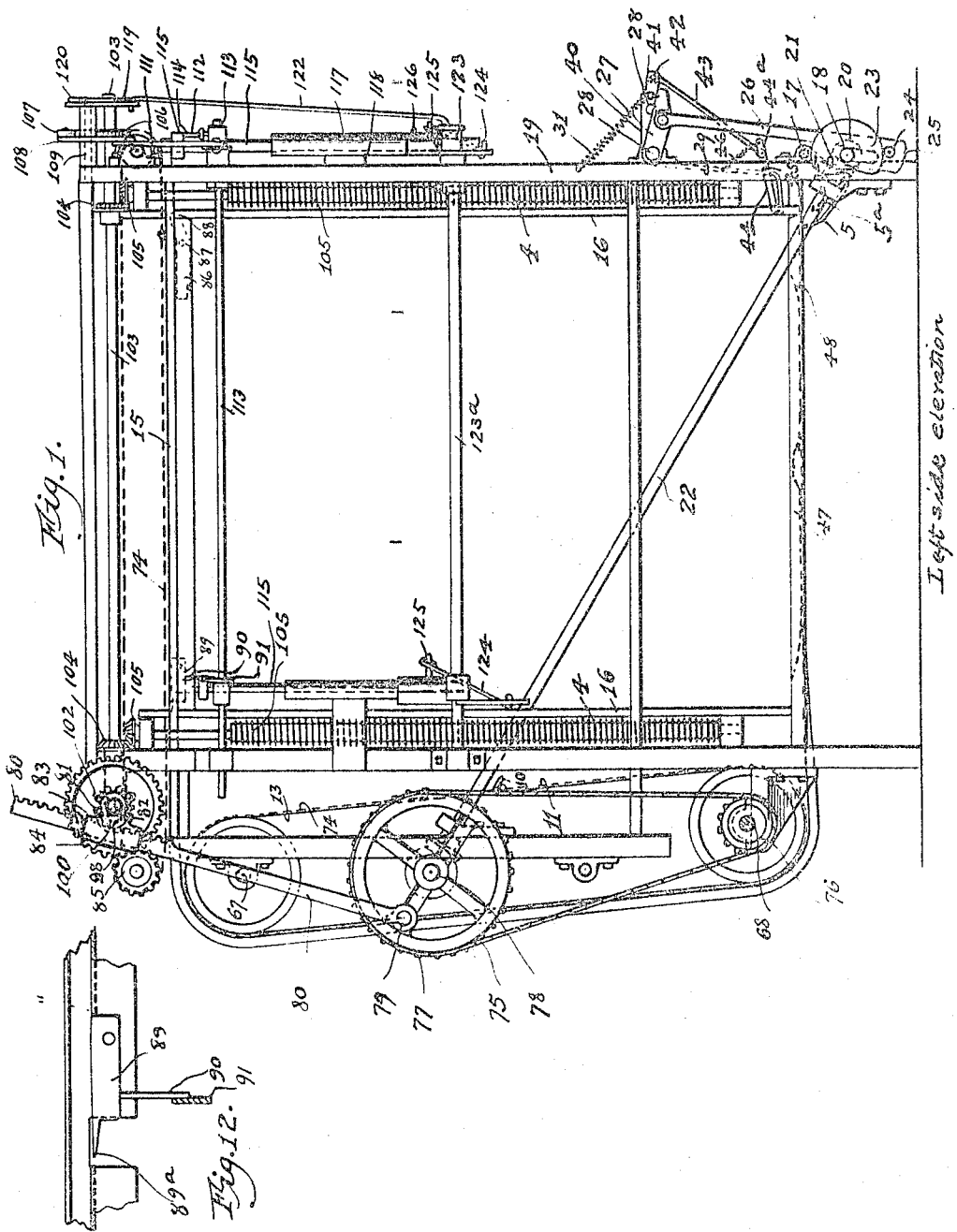

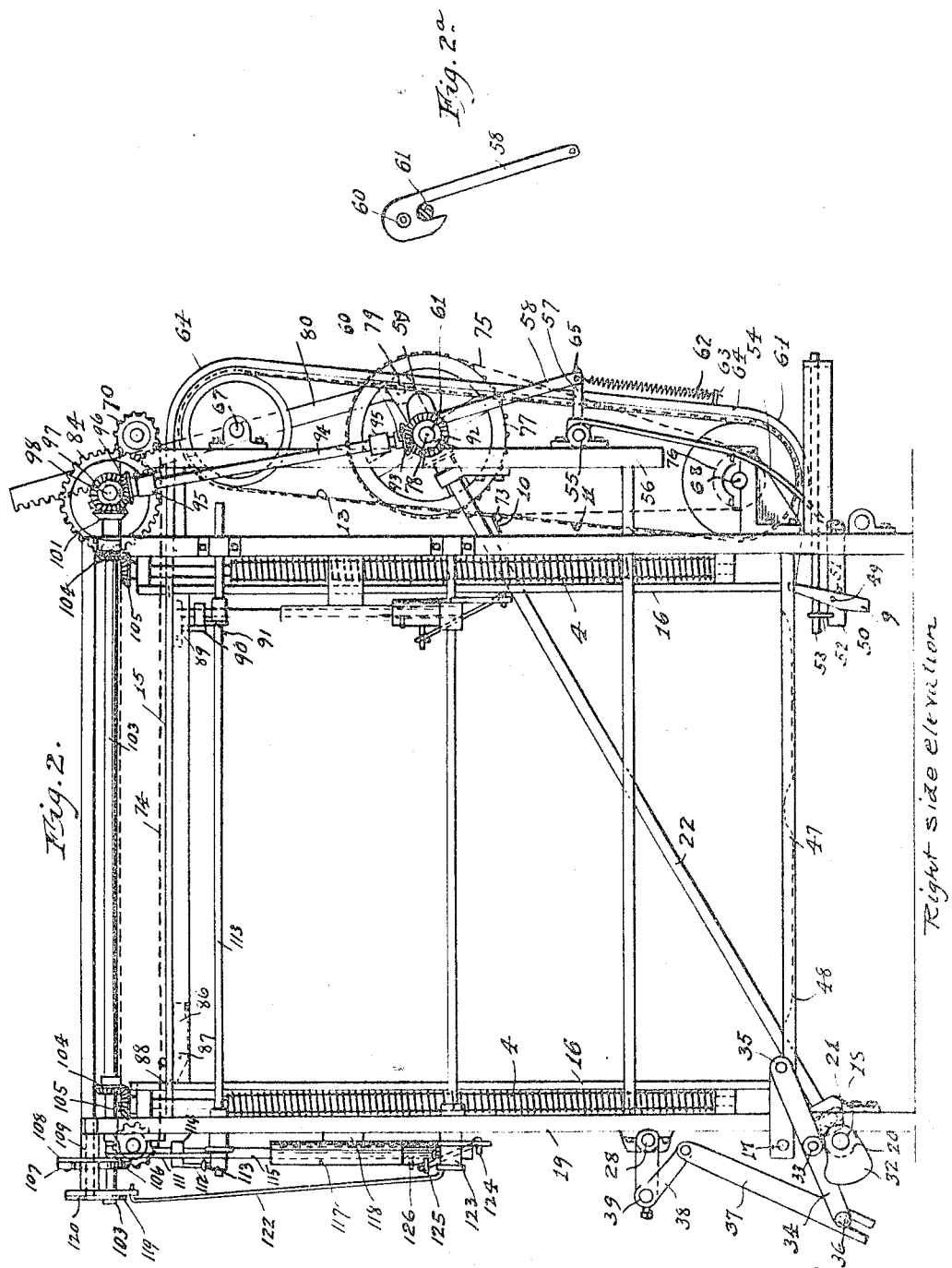

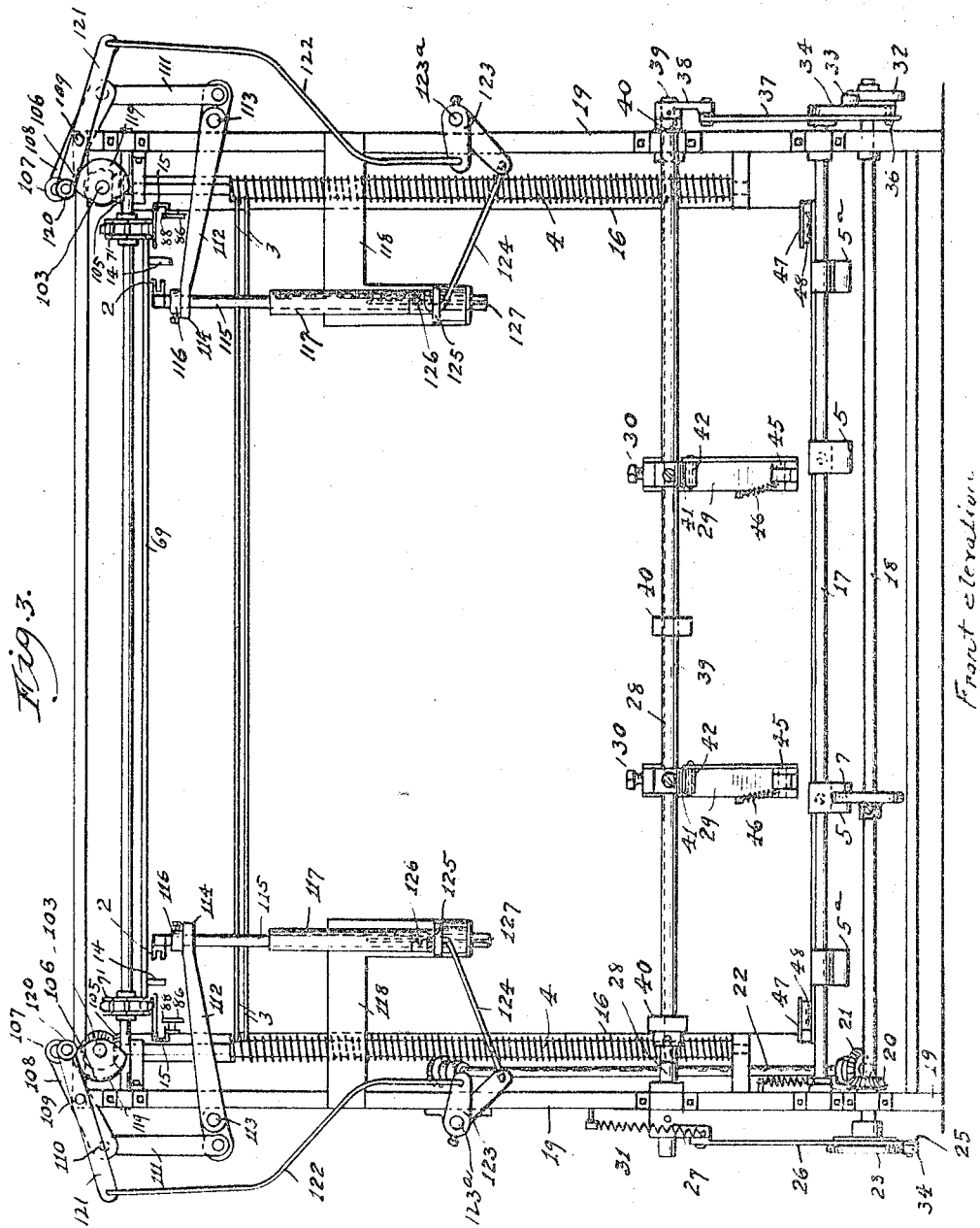

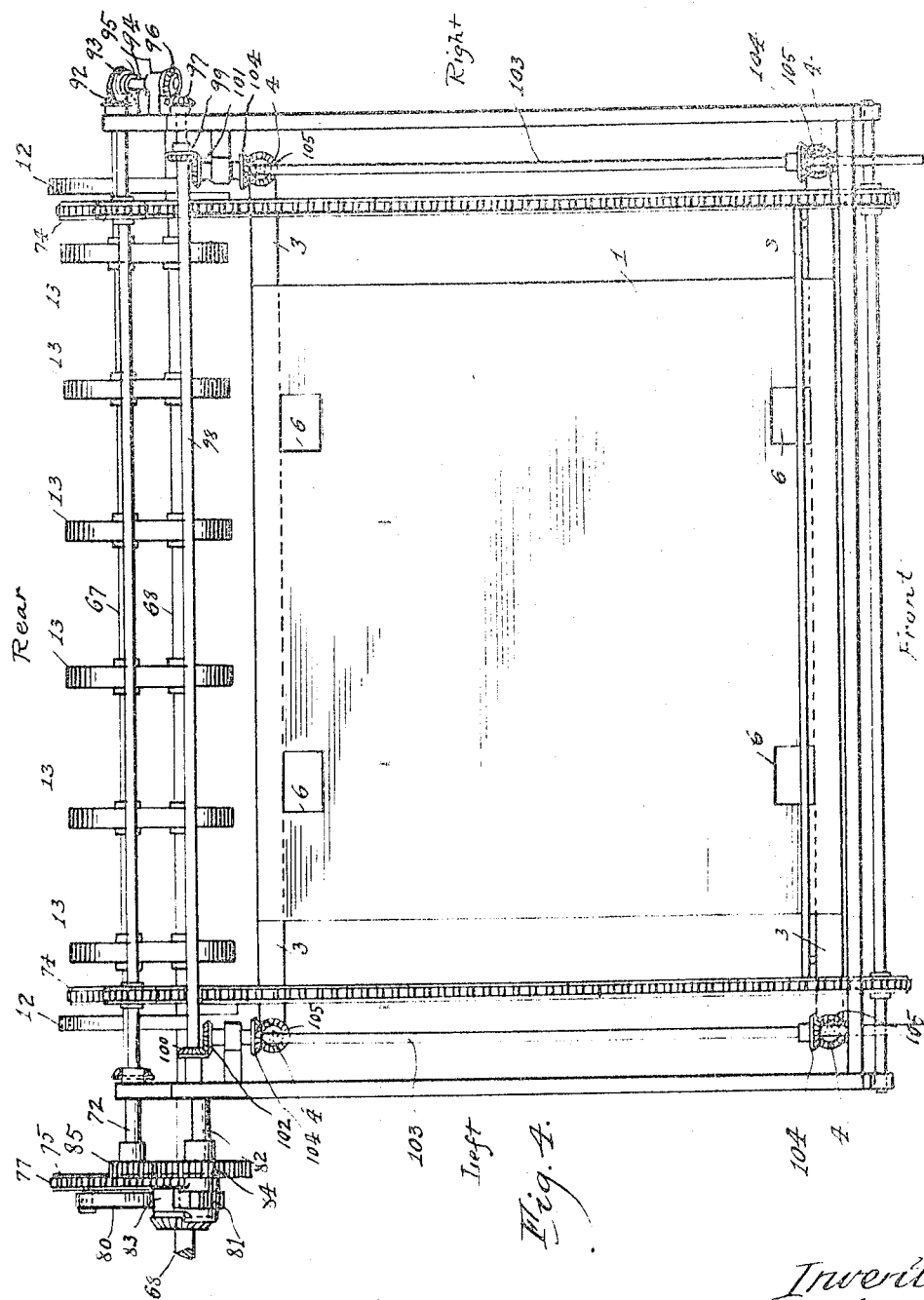

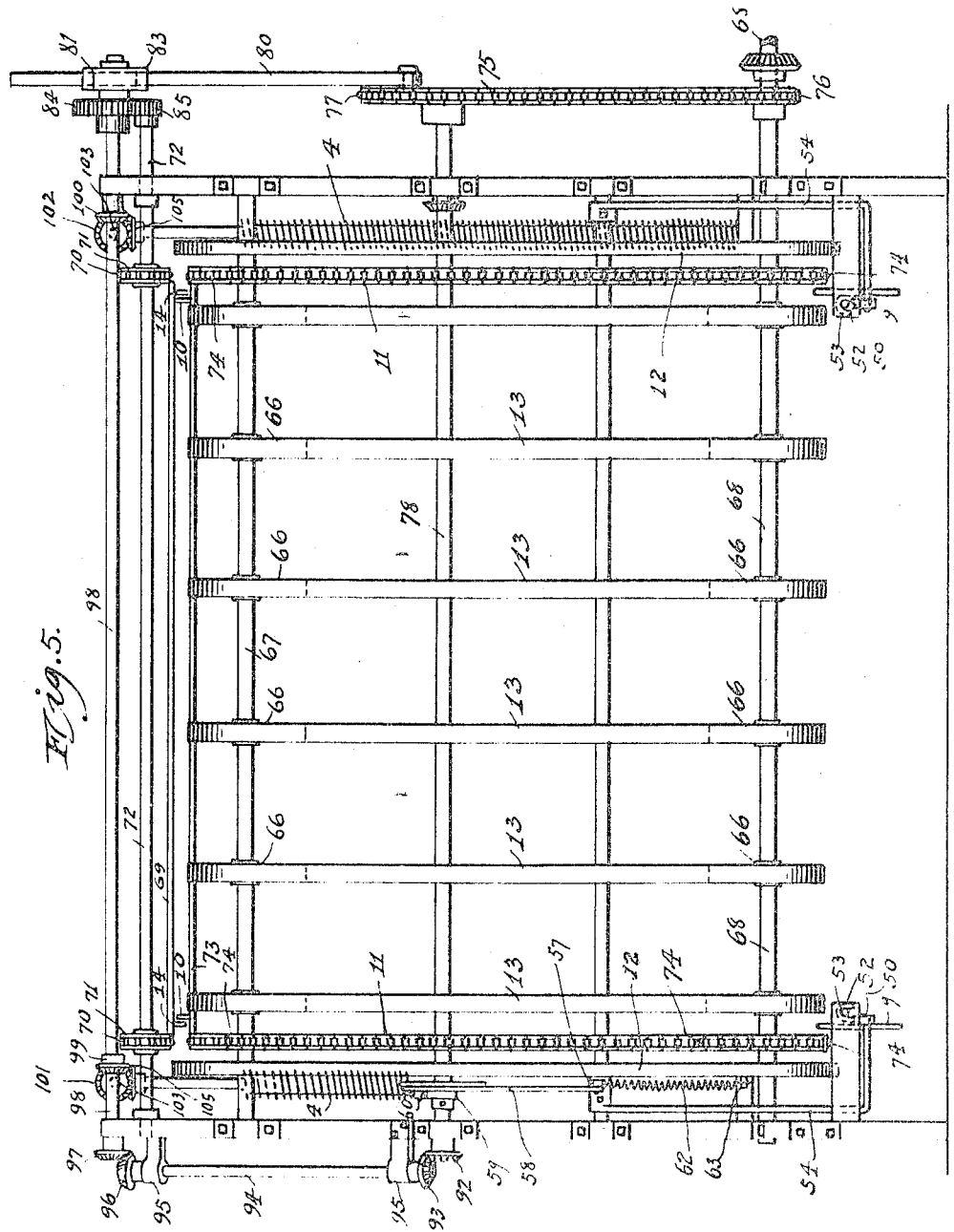

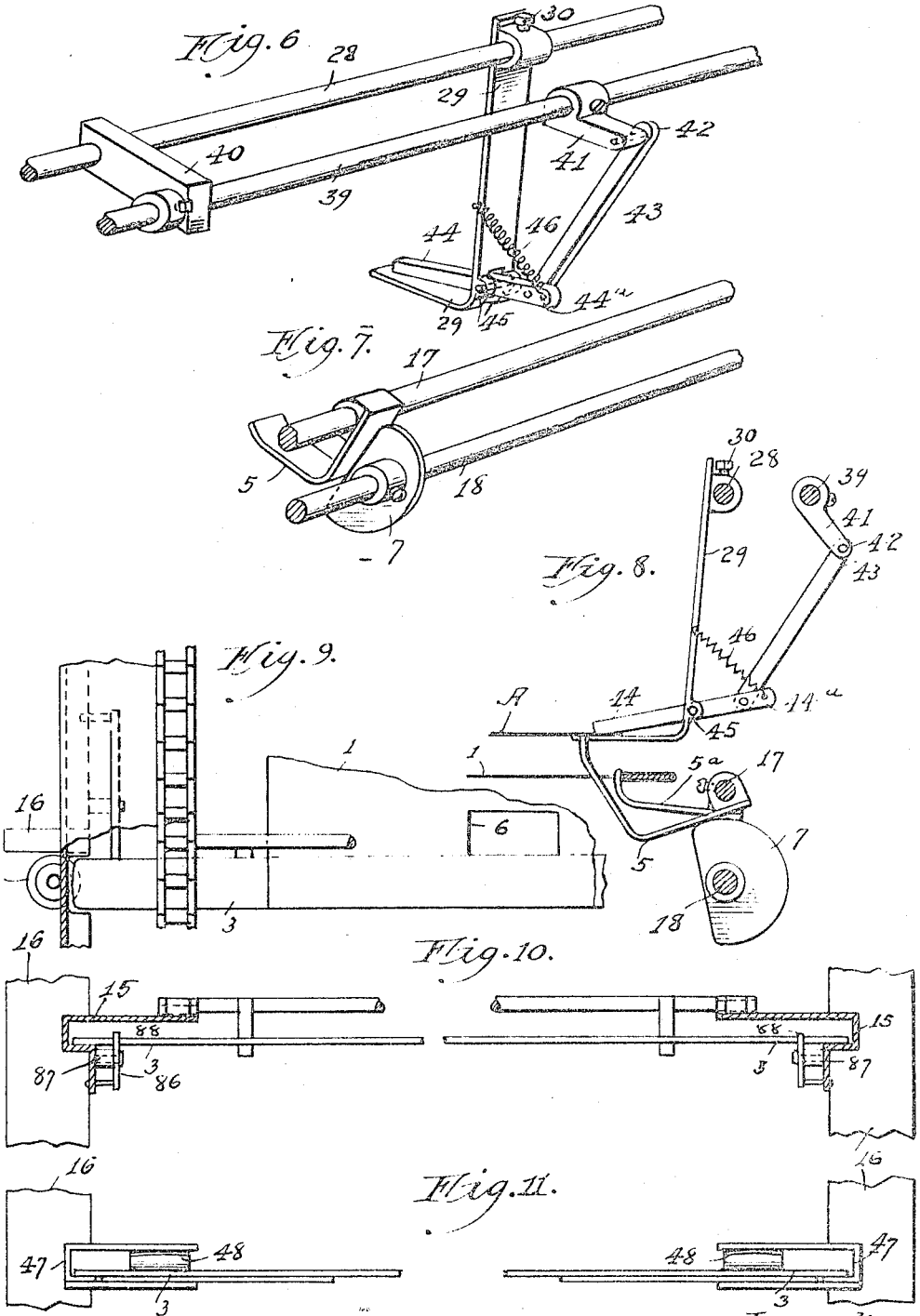

1,524,752

UNITED STATES PATENT OFFICE.

HERMAN J. SCHULTZ, OF CHICAGO, ILLINOIS. ASSIGNOR TO THE W. F. HALL PRINTING COMPANY, OF CHICAGO, ILLINOIS, A CORPORATION OF ILLINOIS.

SLIP-SHEETING MACHINE.

Application filed October 20, 1920. Serial No. 418,173. Renewed July 16, 1924.

*To all whom it may concern:*

Be it known that I, HERMAN J. SCHULTZ, a citizen of the United States, residing in the city of Chicago, county of Cook, and State of Illinois, have invented certain new and useful Improvements in Slip-Sheeting Machines, of which the following is a specification.

This invention relates to improvements in slip-sheeting machines and refers more particularly to a machine to be used in combination with a printing press, color press or any type of mechanism in which it is essential that the sheets be delivered therefrom be temporarily maintained separately in order that the print, color or any other substance imposed thereon have time to set, thereby preventing smutting or what, in the trade, is termed as offsetting or sticking together.

Among its salient objects are to provide a machine adaptable to be connected to any type of printing or color press and one in which the freshly completed sheets as they are fed from the press are held on separate supports until the wet ink or color which produces the offsetting has ample time to set; to provide a machine which operates continuously each supporting band traveling through a continuous cycle, in which it receives a freshly printed sheet, carries the same separately from the rest until the color or print has set, then delivers it to the top of the stack beneath the mechanism, the supporting member or slip sheet being returned to a position where it again receives a freshly printed sheet from the press; to provide a machine that is automatic in every detail and therefore requires no attention; to provide a machine which obviates the additional labor and inconvenience of putting manila or other paper material smut or slip sheet between the individual freshly completed printed or colored matter as it is delivered from the press, such separating sheets necessitating additional labor for their removal; to provide a machine which is rugged of construction and positive in its operation and in general to provide a machine of the character referred to.

In the drawings:

Fig. 1 is the left side elevation of the machine, with parts omitted.

Fig. 2 is the right side elevation, with parts omitted. Fig. 2ª is a detail of connecting link and roller operating pull-up hooks.

Fig. 3 is a front end elevation, with parts omitted.

Fig. 4 is a plan view showing the top position of one of the slip sheets, with parts omitted.

Fig. 5 is a rear elevation.

Fig. 6 is a detail of a gripper.

Fig. 7 is a detail of the cam operating the shoe fly.

Fig. 8 shows the gripper and shoe fly assembled.

Fig. 9 is a fragmentary plan view of one corner of the machine showing the screw feed and guide members.

Fig. 10 is a fragmentary edge view partly in section of the upper guide members.

Fig. 11 is a fragmentary view partly in section of the lower guide members.

Fig. 12 is a detail of the latch or switch for holding the slip sheets in place.

The machine as constructed is composed of standard fittings such as standard size shafting, gears, mitre gears, angles and other steel construction parts. The machine is adaptable for use with the Miehle printing press and particularly with the Miehle extension delivery press. It may, however, be used in connection with any type of printing press, color press, lithographing or any type of machine which requires that the product, when delivered from the machine, have a short period in which to dry or set before being piled or stacked. The function of the machine is to maintain separately the freshly printed sheets for a short period so that the ink, color or any wet substance which has been imposed upon the sheet will have ample time to set or dry before the sheets are piled together. Attempts have been made to prevent the smearing of the freshly printed sheet by inserting below the press a gas burner for drying the ink as it passes down the delivery bands and further provision has been made to prevent offsetting by placing between the printed sheets, as delivered from the press, slip sheets or thin manila or other absorbent material in the form of slip sheets which prevent smutting or smearing of the sheets. The objection to the slip sheet is that they must be twice handled, first in putting them between the printed sheets, and second in removing them when the sheets are to be rerun through the press.

The machine here disclosed, although answering the purpose of a slip sheet, at the same time is not properly a slip sheeting machine as there is no slip sheet employed but rather the separate freshly printed sheets are maintained separately by means of paper supports. A number of sheets are held thus for a considerable length of time, permitting ample opportunity for the fresh ink or color to dry. The supports are then removed and the sheets permitted to drop into a stack or pile.

Briefly, the operation of the machine is as follows: Let us consider the operation of the machine as a cycle and the start of that cycle taking place when a freshly printed sheet A Fig. 8 is delivered from the press onto what we will term as the sheet support 1. Immediately upon delivery of the freshly printed sheet, the support sheet 1 is gripped at all four corners by automatically actuated pull-down hooks 2 operating in timed relation with the machine and the end pieces 3 of the support sheets set upon the four feed screws 4 which are also driven from the machine drive. These feed screws are threaded throughout their lengths with continuous threads of approximately six to an inch. As each freshly printed sheet is delivered from the press, there is a support sheet in place to receive it so that there is continuously a number of sheets running down the feed screws. These screws may be of any desired length and any number of support sheets may be fed as the threads on the screws will accommodate, it only being necessary that the sheets be held a very small distance apart in order that the ink or color will not smear. When the support sheets reach the bottom of the feed screws, shoe fly members 5 are pushed up through apertures 6 by means of cam 7 in the support sheets lifting slightly the rear edge of the printed sheet. Simultaneously with this lifting of the edge of the printed sheet, gripper members are moved towards the printed sheet A and caused to grip the same while the sheet supports are removed from beneath the printed sheet. The grippers are then released and the printed sheet permitted to drop upon the stack. Removing the sheet supports is done by means of pull-up hooks 9 which engage the end pieces 3 on the rear end of the sheet supports and draw the sheet supports in position where they may be engaged by the hooks 10 on the traveling chains 11. These hooks 10 likewise engage the ends of the rear end pieces and draw the sheet supports assisted by the guide members 12 upward to the top of the machine. During the travel to the top of the machine, the sheet supports are run over endless supporting tapes 13. Upon reaching the top of the machine, the rear end piece of the sheet support is transferred from the hooks 10 driven by the vertical chains to the hooks 14 driven by endless chains running horizontally across the top of the machine and adapted to pull the support sheets along the top guides 15 where the support sheet is again in position to receive another freshly printed sheet. It will be understood that there are a number of support sheets continuously passing through this cycle. At one time there may be from two hundred to two hundred and fifty support sheets in operation according to the number of threads in the feed screws.

For convenience, consider the end of the machine, which is set next to the delivery of the press, as the rear and the opposite end the front while the two remaining sides the right and left, respectively as you face the front of the machine.

The construction of the support sheets is important as it is necessary that the end pieces be rugged enough to withstand the pull of the transfer hooks on respective traveling chains and the body of the sheet or that part which supports the printed sheet must be of a material that will not sag unduly so as to rub against and smear the sheet below. For this purpose I employ an extra heavy craft manila stock paper bound at both ends with metallic end pieces 3 preferably of aluminum. The end pieces, in their travel down the feed screws, are held in position by means of vertical guides 16. When the end pieces of one of the support sheets have been fed to a position near the bottom of the feed screws, as previously explained, the shoe fly members 5 which are fixedly mounted on a shaft 17 are actuated by cam 7 mounted on shaft 18 said shaft being rotatably mounted on vertical frame members 19 and driven through the mitre gears 20 and 21 from the diagonal drive shaft 22 which is in turn driven from the main drive of the machine. Simultaneous with the operation of the shoe flies, the hooks 5$^a$ also mounted on shaft 17 and actuated by the cams 7, engage the front end piece and hold the sheet support in place.

When the edge of the printed sheet has been raised by the shoe fly members which project up through the apertures in the support sheet, it is held by means of the grippers, the operation of which is as follows: At the left end of the transverse shaft 18 which, as explained, is driven through the mitre gears by the diagonal shaft 22, is fixedly mounted a cam 23. Operating upon the periphery of this cam is a roller 24 rotatably mounted upon a slotted plate 25. This slotted plate has a reciprocatory motion due to the operation of the roller upon the cam, the slot riding up and down on the shaft 18. This movement is transmitted through an extension arm 26 to a bell crank 27 which is fixedly attached to a shaft 28 likewise mounted upon the corner frame members 19. This up and down movement caused by the roller on the slotted plate running over the cam 23, transmits to the shaft 28 an oscillating rotary movement through a small arc of a circle and due to this movement, the lower jaw 29 of the gripper which is fixedly attached to the shaft 28 by means of set screw 30 is caused to travel to a position of engagement with the edge of the paper sheet at which time the sheet is gripped and held and then moved away from the paper sheet as the printed sheet is released. A spring 31 assists in returning the gripper to position.

To explain now the gripping of the paper sheet by means of the gripping jaws, when the lower jaw has been moved to an engaging position with the printed sheet by the mechanism explained, the upper jaw must be lowered to contact the upper surface of the sheet and grip the same between the upper and lower jaw members. To accomplish this, on the opposite end of the shaft 18 from that on which the cam 23 is mounted, is adjustably mounted a cam 32. On the periphery of this cam, runs a roller 33 rotatably mounted upon an arm 34 which is pivoted at 35 to the frame of the machine. The operation of the cam raises and lowers the opposite extremity 36 of the arm 34 which is fitted in the bifurcated end of the connecting link 37. The connecting link 37 transmits its motion through a bell crank 38 which in turn gives a rotary motion to the gripper shaft 39. This shaft is mounted in bearings in suitable frames 40 and has fastened thereto the supports 41. To these supports are pivoted at 42 connecting links 43 which actuate the upper jaw of the gripper 44, the latter being pivoted at the points at which they pass through slots in the lower jaws 29 at 45. Springs 46 are interposed between the rear projections 44ᵃ of the upper jaws 44 and the vertical portions of the lower jaws 29 and assist the actuation of the gripper jaws. The operation of the grippers is timed with the operation of the machine mechanism so that the printed sheet is held by grippers simultaneous with the removal of the sheet supports which is as follows: The two end pieces of the sheet supports following the vertical guide members 16 are dropped down into the bottom lateral guides 47. Flat springs 48 are fitted within both of these guides to prevent buckling of the sheet supports. When the sheet supports are in position in the bottom lateral guides, the two pull-up hooks 9 are actuated to engage the rear end piece of the sheet support to draw it into position for engagement with the hooks 10 on the vertical chain 11.

In detail, the operation of the pull-up hooks is as follows: The hooks 9 are pivoted at 49 on a slidable member 50. The lower ends of the hooks are weighted to cause them to assume a vertical position. Also a pin 51 is inserted in the front of the hook permitting it to dip forward but preventing its rotation backward further than a vertical position. Hooks 52 fixed to the slidable member 50, slide along a rod 53 and furnish sliding supports for the pull-up hook assemblies. These supporting rods 53 are supported by the machine frame. To the forward end of the slidable member 50 is connected a stiff rod 54 which is pivoted at 55 to the frame member 56 and, being fixedly attached to the arm 57 and connecting link 58, is actuated by their movement which is that of a cam 59 and a roller 60. The crank movement transmitted from this cam and roller operated by shaft 61 draws the pull-up hooks forward when they are engaging the rear end pieces of the support sheets to a position to be engaged by the hooks 10 on the vertical chains 11 and pushes the hooks back to a position for engagement with the next oncoming support sheet. It will be noted that when the pull-up hooks are moved backward to an engaging position, the end pieces will contact the upper portion of the hooks and force them downward until they have passed the end pieces, at which time the weighted end of the hooks will bring them back to a vertical position behind the rear end pieces and engaging the same. The function of the flat springs in the bottom guides is now better appreciated as the sheet supports are kept constantly taut and offer no difficulties due to the end pieces becoming fouled in the lateral guides due to the buckling of the sheet supports. Tension springs 62 fastened at 63 to the vertical guide 12 and pivotal connections 65 between the connecting links 57 and 58, assist in returning pull-up hooks to a normal position for engagement with the rear end piece of the sheet support positioned in the bottom guides.

Simultaneous with the engagement of the hooks 10, with the rear end piece of the sheet support, the latter is fed into the guides 12 which are bent vertically upward and direct the travel of the sheet support to the top of the machine. During this travel, the body of the sheet support is contacted by the vertical tapes 13 riding on pulleys 66 mounted on shafts 67 and 68. When the end piece which is drawn up to the top of the machine by hooks 10 reaches a position in the cycle of the machine shown in Fig.

5, the end piece is transferred from engagement with the hooks 10 to the hooks 14 mounted on a rod 69 and given an oscillating movement through the sprocket chains 70 operating on sprockets 71 mounted on the shaft 72. The chains 11 to which are fixed the transverse rod 73 on which the hooks 10 are mounted, are driven over upper and lower sprockets 74, the upper being mounted upon the shafts 67 and the lower on the shaft 68, the power being transmitted through the lower shaft. The upper lateral guides 15 are nothing more than a continuation of the vertical guides 12 so the travel of the support sheets is uninterrupted. The oscillating movement of the continuous chains 70 operating at the top of the machine, is produced in the following manner.

From the drive shaft 68 is driven a chain 75 over the lower sprocket 76 and the upper sprocket 77, the latter being mounted on a transverse shaft 78. To one of the spokes of the sprocket is pivoted at 79 a rack 80 meshing with the pinion 81 mounted on a stub shaft 82. A keeper 83 holds the rack at all times in mesh with the pinion 81 which, together with another gear 84, is fixedly mounted on a stub shaft 82. The pinion 84 meshes with another pinion 85 mounted upon the shaft 72 thereby transmitting to said shaft the oscillating movement produced by the actuation of the rack 80. The chains 70 running over the sprockets mounted on shaft 72 are given this oscillating movement. That is, when the hooks 14 engage the end pieces of the sheet supports which are brought to the top of the machine on the vertical chain 11, they move the sheet support along the top of the machine during which travel the end pieces of the sheet supports travel in the lateral guides 15. When the sheet support has reached a position for receiving the freshly printed sheet, the rear end piece which was engaged by the hooks 14 now becomes the front end piece as it is situated in front of the machine. With the disengagement of the hooks 14, this front end piece drops over the stops 86 pivoted at 87 below the top guides and adapted to permit the end piece to ride over it and catch behind its raised end 88. This prevents the end piece from sliding backward in the guide thereby preventing the sheet support from buckling with a consequent smearing of the freshly printed sheet which lies on the sheet support directly below. To prevent the rear end piece from sliding in the guide, the switches 89 are pivotally set below the upper channel guides near the rear of the machine and are contacted by extensions 90 connected to the rocker arms 91 fixed to shaft 113 and operating in timed relation therewith so that the front end piece passes over the top of the switch and as the rear end piece approaches it, the switch is raised so that the tapered end 89ª engages this end piece and prevents its further travel. This will prevent the end piece from sliding further toward the front of the machine and will likewise hold the sheet support taut. Each sheet support as it reaches this position, stretched between the front stop dogs 86 and the rear switches or latches 89, has received the freshly printed sheet from the press delivery.

It is essential that the two extremities of the metallic end bars or end pieces be fed simultaneously to the feed screws and for this purpose I have incorporated pull-down hooks 2 at each corner of the machine which are adapted to engage the ends of the metallic bars as they rest in the top lateral guides and lower the same to rest upon the top of the feed screws. These pull-down hooks have both a vertical and rotary movement. The vertical movement affects the lowering of the sheet supports while the rotary movement provides a means whereby the bifurcated portion of the pull-down hooks engage and disengage the metallic end pieces 3 of the sheet supports. In this connection and related thereto are the driving connections to each of the four feed screws. The sprocket chain 75 drives the transverse shaft 78 from driving shaft 68. On the opposite end of the shaft 78 from that on which the gear 77 is mounted, is a mitre gear 92 which meshes with a second mitre gear 93. The latter gear is mounted on the vertical drive shaft 94 supported by bearings 95. To the top of this shaft is keyed a third mitre gear 96 meshing with the gear 97, the latter being mounted on the shaft 98. To this shaft 98 are fixedly mounted the beveled gears 99 and 100 which mesh with beveled gears 101 and 102 driving two horizontal shafts 103 on which are mounted beveled gears 104 which through the beveled gears mounted on the tops of the vertical feed screws 105 operate to rotate the feed screws at the proper rate; that is, at a speed to slowly feed the sheet supports from the top to the bottom of the screw permitting ample time for the drying of the wet ink or color imposed thereon.

To return to the operation of the pull-down hooks, cams 106 are mounted at one end of the horizontal shafts 103. Operating on the periphery of the cams 106 are rollers 107 mounted on cross arms 108 the latter being pivoted at 109 to the frame of the machine. To the opposite ends of the cross arms at 110 are connected links 111, to the lower ends of which are connected the pivoted arms 112, these arms being pivoted on a rock shaft 113 to the frame of the machine and having their long ends 114 connected to the slidable rods 115 by means of an adjustable collar 116. The vertical rods 115 are slidably mounted in the sleeve supports 117 which are in turn mounted on brackets 118. The vertical movement induced to the cross arms 112 by the action of the cams 106 through the connections explained is transmitted to the vertical rods 115. At the same time a second set of cams 119 similar to those shown at 106 and similarly mounted on the shafts 103, produce a rotary movement to the vertical rods 115 through the following connections: On the perimeter of the cam 119, ride the rollers 120 mounted on the pivoted cross arms 121. To the opposite ends of the cross arms on which the rollers 120 are mounted, are fastened the bent rods 122. These rods operate the bell cranks 123 fixed to the rock shafts 103ª and pull the links 124 back and forth these links being hooked through the projecting lugs 125 on the rotatable sleeves 117, they rotate the sleeve and rod through the arc of a circle. The vertically slidable rods 115 are prevented from rotary movement within the rotatable sleeves 117 by the pins 126 mounted in the sleeves and sliding in the keyways 127 cut in the shafts or rods 115. A similar rotary and vertical movement is transmitted to pull down hooks mounted on both corners of the rear of the machine within the frame by the rock shafts 123ª and 113 operating pull down hooks similarly mounted as those upon the front of the machine.

The operation of the pull down hooks 2 which are mounted at the top of these vertical rods 115 is as follows: As the freshly printed sheet is deposited upon the sheet support which is stretched in the top lateral guides, the pull down hooks are so timed with the machine mechanism that the bifurcated hook portions 2 are raised and rotated to engage the four corners of the sheet support: that is, both ends of the metallic end pieces, and with continued operation lower the sheet support onto the top of each of the four feed screws at which time the pull down hooks are rotated to a position of disengagement and again raised to lower the next oncoming sheet support. It is obvious from this that both ends of each of the metallic end pieces of the sheet support are lowered simultaneously onto the top of the feed screws and are engaged by the threads of the screws simultaneously whereby the sheet supports are fed uniformly throughout the length of their travel on the feed screws.

This completes the cycle of travel of one of the sheet supports and it will be understood that there are a plurality of sheet supports operating continuously in the machine. As many as 200 or 250 sheet supports may be fed by the feed screws according to their length and the length of time necessary for the drying of the printed or color matter on the printed sheet will govern to a certain extent the number of sheets in operation and the period of time of their travel on the feed screws.

With the aid of this machine, the smutting, smearing and off-setting, due to the freshly printed matter coming in contact with other sheets stacked immediately as they are delivered from the press, is absolutely obviated. Where so much color work is necessary as in printed matter of the present day, the cost and labor of offsetting and smutting has become a substantial item.

I do not wish to limit myself to the details of the invention except as hereinafter disclosed and more particularly brought out in the claims.

This machine is preferably connected to the delivery end of any printing or color press or any other type of machine from which is delivered sheets having imposed thereon smearable or viscid substances. The machine is driven from the drive of the printing or color press by means of a drive shaft not shown. It is essential, however, that the drive of the machine be so regulated that all of the mechanical parts connected with the machine herein explained be driven in timed relation and at a proper speed relative to the speed of the press itself.

I claim as my invention:

1. In a machine for drying printed sheets for use with a printing or color press, the combination with a frame member, of flexible supporting members having end stay rods thereon adapted to receive the freshly printed sheets from the press screw threaded lowering means adapted to engage the end stay rods of the support members thereby maintaining the same separately for a predetermined period of time.

2. In a machine for drying paper sheets delivered from printing or color presses, the combination with a frame member set at the delivery end of said presses, of flexible supporting members horizontally positioned and vertically arranged one above the other on said frame and adapted to receive the freshly printed sheets from the press in stay rods carrying the flexible supports, means for gripping the edge of the supported sheets and means for withdrawing the supports from the sheets and means returning them successively to a position for receiving the continuously oncoming freshly printed sheets from the press delivery.

3. In a machine for drying sheets having temporarily smearable or viscid substances thereon, the combination with a frame member, of supporting members on said frame screw threaded feeding means engaging the supporting members and feeding them downwardly adapted while maintaining them separately in substantially a horizontal position and means for depositing the sheets from the supporting members when the substance imposed thereon has sufficiently set or dried.

4. In a machine for drying sheets delivered from a printing or color press, the combination with a frame connected to the delivery end of said press and driven in timed relation therefrom, of a plurality of flexible sheet supports driven by mechanism mounted on said frame to travel in a continuous cycle, each sheet support successively positioned to receive a single freshly printed sheet from the press, a vertical screw feeding means for maintaining the supports at predetermined intervals apart, and for vertically lowering the supports while maintaining them in substantially a horizontal position, means for raising and gripping an edge of the supported sheets at substantially the lowest point in their vertical travel, and means for withdrawing and returning said sheet supports successively and continuously to a position for receiving the oncoming freshly printed sheets from the press.

5. In a machine for drying printed paper sheets delivered from a printing press, the combination with a frame member set at the delivery end of a press, of a plurality of flaxible supports having end stay rods, vertical screw feeds adapted to lower the flexible supports while maintaining them in a predetermined space relation and in substantially a horizontal position, means for raising and gripping the edge of the sheets at approximately the end of their vertical travel and means for successively withdrawing the supports from the sheets and returning them continuously to their initial position for again receiving the oncoming freshly printed sheets from the press.

HERMAN J. SCHULTZ.